(12) United States Patent
Wei et al.

(10) Patent No.: US 7,945,121 B2
(45) Date of Patent: May 17, 2011

(54) METHOD AND APPARATUS FOR INTERPOLATING IMAGE INFORMATION

(75) Inventors: Jeff X. Wei, Richmond Hill (CA); Marinko Karanovic, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 1123 days.

(21) Appl. No.: 11/467,978

(22) Filed: Aug. 29, 2006

(65) Prior Publication Data

US 2008/0056617 A1    Mar. 6, 2008

(51) Int. Cl.
*G06K 9/32* (2006.01)
*G09G 5/00* (2006.01)

(52) U.S. Cl. ........................................ 382/300; 345/611
(58) Field of Classification Search .................... 382/300
See application file for complete search history.

(56) References Cited

U.S. PATENT DOCUMENTS

| 7,359,554 | B2 * | 4/2008 | Klingensmith et al. | 382/199 |
| 7,379,626 | B2 * | 5/2008 | Lachine et al. | 382/300 |
| 2003/0138150 | A1 * | 7/2003 | Srinivasan | 382/238 |

OTHER PUBLICATIONS

Tai, S.C. et al.; A Motion and Edge Adaptive Deinterlacing Algorithm; IEEE Int'l Conf. on Multimedia and Expo; 2004; pp. 659-662.
Bakker, P. et al.; Edge preserving orientation adaptive filtering; IEEE; 1999; pp. 535-540.
Martinez, Dennis M. et al.; Spatial Interpolation of Interlaced Television Pictures; IEEE; 1989; pp. 1886-1889.

* cited by examiner

*Primary Examiner* — Hadi Akhavannik
(74) *Attorney, Agent, or Firm* — Vedder Price P.C.

(57) ABSTRACT

A method and apparatus for interpolating image information obtains pixel information for a plurality of pixels surrounding a location of a pixel to be interpolated, whether the pixel is a missing pixel or an existing pixel whose color or intensity information is to be changed, and applies a gradient square tensor operation on a plurality of surrounding pixels to determine if the pixel to be interpolated is part of a geometric feature. If it is determined that the interpolated pixel is part of a geometric feature, such as a diagonal line or other suitable geometric feature, the method and apparatus uses pixel information from at least some of the surrounding pixels that are also determined to be the in geometric feature. This may be performed on a group of pixel basis and may include, for example, utilizing a block or kernel of pixels and a moving window of blocks of pixels to utilize the plurality of surrounding pixels.

12 Claims, 4 Drawing Sheets

METHOD AND APPARATUS FOR INTERPOLATING IMAGE INFORMATION

BACKGROUND OF THE INVENTION

The invention relates generally to methods and apparatus for interpolating image information to, for example, reconstruct missing pixel information and/or missing lines in a video field or other set of pixels using existing pixel information, and more particularly to methods and apparatus for interpolating image information associated with diagonal angles or other specific geometric feature in an image.

Interpolating image information to change existing pixels or generating missing pixels, for example missing lines or individual pixels using interpolation techniques are known in the printing field and screen display field. Interpolation can be used for many purposes including, but not limited to, scaling an image or portion of an image in size up or down in any suitable direction, speeding up the processing by utilizing fields of video to produce frames from information from a field or for any other suitable purpose. Deinterlacing of even and odd fields of interlaced video fields to produce frames of video is also known. Known solutions include, for example, spatial domain deinterlacing techniques such as bob techniques which interpolate missing lines or pixel information from existing pixels that are present, for example, in a video field using averaging techniques that may include the intensity information of one or more surrounding existing pixels in existing lines above and below a particular position.

Weaving and other temporal domain deinterlacing methods are also known which employ, for example, interpolating missing pixels by averaging or otherwise combining pixel information over a number of sequential and non-sequential fields or frames. Also, different blocks of pixels in a frame may be interpolated using bob or weave techniques or other techniques.

A bobbing method may average two closest pixels to reconstruct missing lines but can create jagged looking diagonal lines. Other spatial domain methods may calculate orientation for example, by finding correlation between diagonal pixels and interpolate between the most correlated pixels. However, such methods may have a high diagonal orientation selection error unless sophisticated decision making techniques are employed. In addition, a wide kernel of pixels (a kernel may be for example, a block of nine pixels in a 3×3 array or any other suitable configuration) may be needed to determine shallow angles but the orientation selection can be more prone to error. When a wrong orientation angle is selected, it may generate undesirable artifacts in the output image, whether output on paper or display screen.

Other types of interpolation such as motion adaptive deinterlacing and motion compensated deinterlacing are also known. Motion adaptive (MA) deinterlacing detects motion between consecutive video fields and takes the motion into account when interpolating information. Motion detection, in its simplest form, is accomplished using inter-field differences (either differences between fields of same polarity, consecutive fields (of opposite polarity) or a combination of both). In areas of detected motion, typically motion adaptive deinterlacer falls back to spatial deinterlacer, which is an interpolator utilizing only the pixels in the spatial vicinity of the pixel to be interpolated. Motion compensated (MC) deinterlacers use extracted motion vectors of a field to interpolate along motion trajectories. In both cases, spatial deinterlacing is typically used as a fall-back mechanism. Without falling back to spatial deinterlacing, MA and MC would suffer weaving artifact, which is very objectionable to the observer. Spatial-only deinterlacer itself would produce viewable result, though might be perceived as lack of detail and/or flickering in still area of the video.

Gradient square tensor operations are also known and are typically used to perform edge detections to detect, for example, line edges or edges of other portions of images in a frame, for example and may be used for pattern recognition purposes. However, such edge detection techniques are not known to be used in connection with, among other things, pixel interpolation.

Pixel interpolation methods may be employed in any suitable application and may be employed, for example, by digital televisions, cell phones, cameras, camcorders, printers or any other suitable device and may be implemented using one or more processors such as CPUs, video graphics coprocessors, discrete logic, or any other suitable structure.

Where the device requires battery power, such as handheld devices or other portable devices, it may be desirable to provide a relatively accurate and uncomplex mechanism to save processing resources and reduce battery power consumption. In addition, it may be desirable to provide a low complexity and relatively accurate interpolation technique that may be suitably applicable to diagonal angles or other geometric features that are detected in an image such as a frame, field, or other suitable collection of pixel information.

Figure 1:
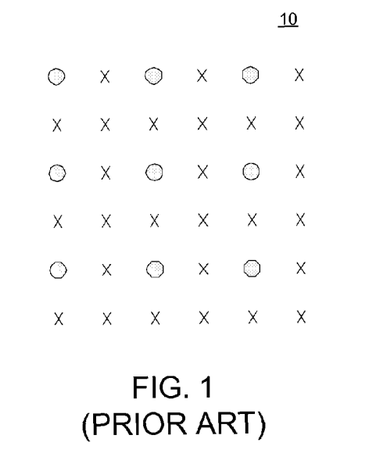
FIG. 1 is a diagram illustrating one example of missing and existing pixels.

For purposes of background information, FIG. 1 illustrates a portion of an image 10 wherein the pixels marked "X" are missing pixels and are reconstructed from original pixels which are marked as "O". As such, the diagram illustrates a portion of an image that contains missing pixels prior to interpolation and final image generation. If the missing pixels are reconstructed, the image resolution is doubled both horizontally and vertically. Conventional methods for interpolating the missing pixels include, for example, bilinear interpolation, polyphase filters, spline-interpolation such as bicubic interpolation, and other suitable methods. However, such methods typically do not consider local texture orientation and typically do not reconstruct diagonal lines properly.

Figure 2:
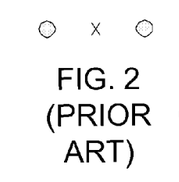
FIG. 2 is a diagram illustrating one example of a missing pixel and potential existing pixels that may be used to determine the value of the missing pixel.
Figure 3:
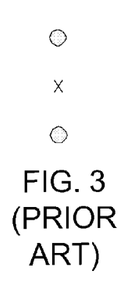
FIG. 3 is a diagram illustrating one example of a missing pixel and potential existing pixels that may be used to determine the value of the missing pixel.
Figure 4:
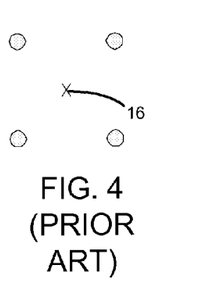
FIG. 4 is a diagram illustrating one example of a missing pixel and potential existing pixels that may be used to determine the value of the missing pixel.

FIGS. 2-4 illustrate three types of missing pixels or pixels to be interpolated. FIG. 2 shows the pixel to be interpolated to be in the middle of two horizontal original pixels, FIG. 3 shows the pixel to be interpolated to be in between two vertical original pixels and FIG. 4 illustrates a pixel to be interpolated that is in the center of a square formed by four adjacent original pixels.

Figure 5:
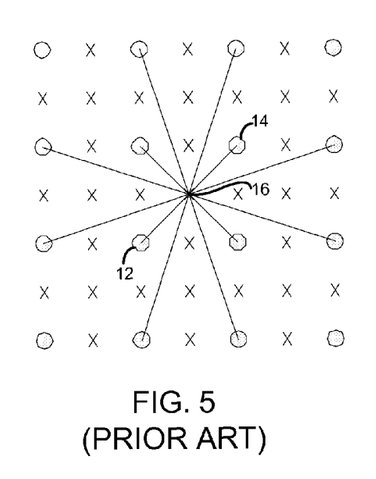
FIG. 5 is a diagram illustrating potential line orientations that a missing pixel may fall in and corresponding pixels that may be used to determine a value of a missing pixel depending upon the angle or orientation of a line containing the missing pixel.

For a pixel to be interpolated, the local area surrounding the pixel of interest may exhibit a certain specific geometric feature such as a line, an edge, or a slope orientation being diagonal, so that the pixel to be interpolated may be suitably reconstructed by averaging pixels over the pixels along a line that closely follows the orientation. FIG. 5 illustrates a number of possible orientations for the missing pixel of a group of a pixel shown, for example, in FIG. 4. Once an orientation is determined, a missing pixel value can be calculated, for example, as the average of two original pixels that tap the ends of the line. For example, if the pixels 12 and 14 are determined to be in a geometric feature such as in a diagonal line, the pixels 12 and 14 can be averaged to determine the missing pixel X shown as missing pixel 16. However, if the local area does not exhibit any type of specific geometric feature, the missing pixel value may be an average of the nearest four pixels in this example. However, it would be desirable to have a circuit, apparatus and methods to provide improved image interpolation.

BRIEF DESCRIPTION OF THE DRAWINGS

The disclosure will be more readily understood in view of the following description when accompanied by the below figures and wherein like reference numerals represent like elements.

DETAILED DESCRIPTION OF THE PRESENT EMBODIMENTS

A method and apparatus for interpolating image information obtains pixel information for a plurality of pixels surrounding a location of a pixel to be interpolated, whether the pixel is a missing pixel or an existing pixel whose color or intensity information is to be changed, and applies a gradient square tensor operation on a plurality of surrounding pixels to determine if the pixel to be interpolated is part of a geometric feature. If it is determined that the interpolated pixel is part of a geometric feature, such as a diagonal line or other suitable geometric feature, the method and apparatus uses pixel information from at least some of the surrounding pixels that are also determined to be the in geometric feature. This may be performed on a group of pixel basis and may include, for example, utilizing a block or kernel of pixels and a moving window of blocks of pixels to utilize the plurality of surrounding pixels.

In one example, applying the gradient square tensor operation on the plurality of surrounding pixels includes determining an orientation angle of the plurality of pixels using the pixel information of the plurality of pixels and determining a degree of confidence of the orientation angle of the plurality of pixels. This may include, for example, using both horizontal and vertically aligned pixels if desired. If a degree of confidence is high enough, such as beyond a desired threshold, then the pixel to be interpolated is verified as being part of the geometric feature. This may include, for example, correlating pixels of the plurality of pixels to verify the determined angle of orientation using both horizontal and vertically positioned pixels that are about the location of the pixel to be interpolated. The method may be utilized, for example, on a per kernel (e.g., block or other grouping of pixels) in a frame, field, or other portion of an image and the steps are repeated on a group of pixels basis such as a kernel basis in a field of pixels for all desired groups in the field to produce a frame of pixel information. As such, in one example, a kernel of pixels in a field is selected for orientation calculation. The pixels in the kernel surround the missing pixel that is to be constructed. The size of the kernel may start, for example, from a 2 row×3 column size to any suitable size that result in a suitable estimation of the orientation of information. In one example, a 4 row×5 column kernel size is used. The determination as to whether a pixel to be interpolated is part of a specific geometric feature may include determining the orientation by using, for example, squared gradients calculations, low pass filtering and matrix construction for obtaining the orientation angle. Based on the angle calculated, one pixel from a row above a missing pixel and another pixel from a row below the missing pixel may be selected so that they are pixel pairs that correlate to the angle that has been detected. The missing pixel may be then assigned the average of the two selected pixels.

To further ensure the correct selection of the angle, an anisotropy index of the kernel may be obtained based on the eigenvalue of a Hessian matrix. If the kernel is anisotropic, the angle selection that has been detected is considered to have a high confidence level, otherwise the angle is discarded and a simple bobbing methodology may be used to interpolate the missing pixel. To further ensure that a correct selection of the angle has been made, additional operations may also be carried out. This includes, for example, correlation of the pixel by, for example, calculating absolute differences between pixel pairs along the diagonal line that cross the missing pixel that is to be generated.

Figure 6:
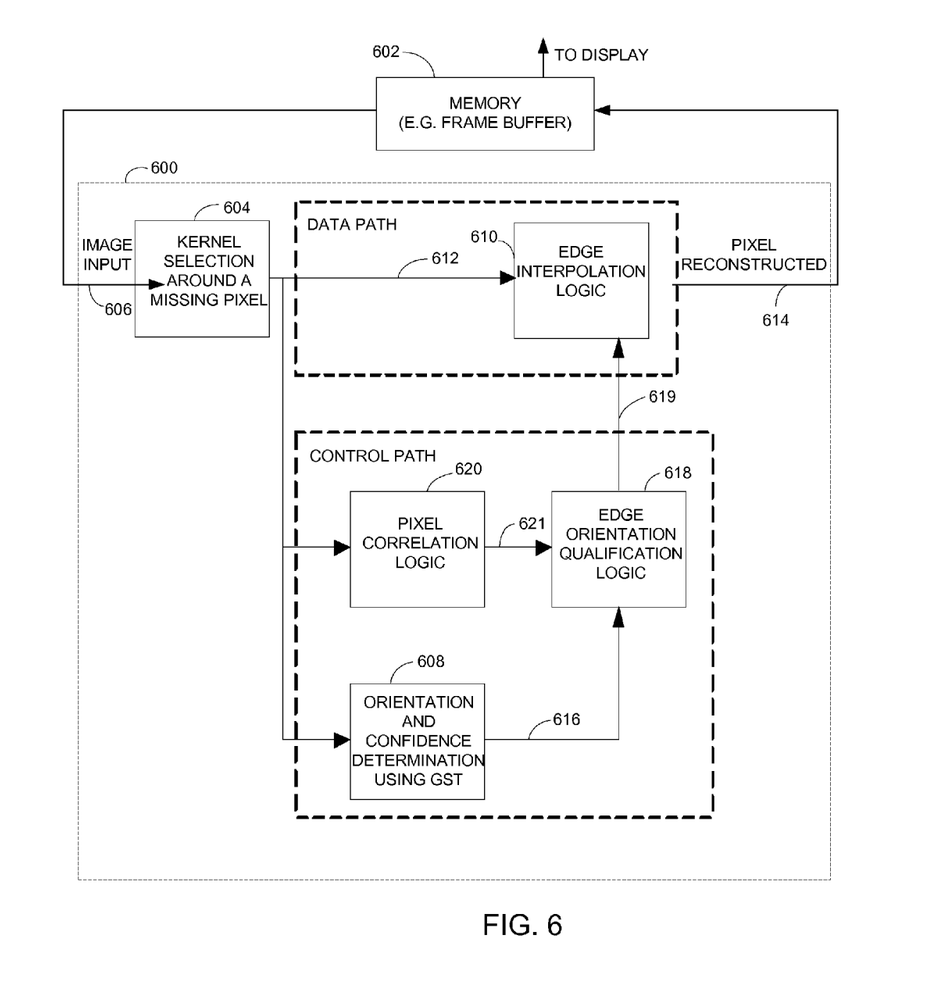
FIG. 6 is a block diagram illustrating one example of an apparatus for interpolating image information in accordance with one embodiment of the invention.

FIG. 6 illustrates one example of an integrated circuit 600 that includes or is operatively coupled to memory 602 such as a frame buffer, system memory, removable memory, RAM, ROM or any other suitable memory structure. The memory could include an input field memory and output frame memory or input field memory but no frame memory if the output frame is output to a display. However any memory configuration can be used. The integrated circuit 600 may be, but is not limited to, for example, an application specific integrated circuit, such as a video graphics co-processor with programmable shaders, a DSP, CPU, discrete logic, a combination thereof or any other suitable structure. As used herein, an integrated circuit can also include memory that contains executable instructions that when executed by a processing unit causes the processing unit to carry out the operations as described herein. Alternatively, the integrated circuit may be made up of logic blocks having the functions described herein that carry out the operations described. In this example, the integrated circuit 600 includes circuitry 604 that obtains pixel information 606, such as color or intensity information for a plurality of pixels surrounding a location of a pixel to be interpolated. The pixel information 606 of a plurality of pixels surround the location to be interpolated may be obtained from any suitable source and in this example is shown to come from a stored field of pixel information stored in memory 602. As such, the circuitry 604 identifies one or more pixels to be interpolated and selects neighboring pixels that are existing and that are surrounding either adjacent or non-adjacent to a location of a pixel to be interpolated. The integrated circuit 600 also includes circuitry 608, operative to apply a gradient square tensor operation on the plurality of the surrounding pixels to at least determine if the pixel to be interpolated is part of a specific geometric feature, such as a diagonal line or other suitable specific geometric feature. The integrated circuit 600 also includes circuitry 610 operative to interpolate the pixel to be interpolated using pixel information from at least some of the surrounding (pixel information 612) pixels that are also in the geometric feature. The interpolated pixel 614 also referred to as a reconstructed pixel, may be then suitably stored in memory 602, and provided to a display, left in memory for later use, or utilizes in any other suitable manner. The circuitry 604 then obtains or selects the next window or group of pixels in the same field and repeats the process as desired to interpolate all necessary missing pixels. In one embodiment a complete frame of information is stored in memory 602 based on, for example, a single field of video information. It will be recognized that the field of video information includes, for example, texture information, video information from an interlaced stream of video, if desired, or any other video information of pixel information that requires an interpolation of pixel information.

In this example, the circuitry 608 is also operative to determine an orientation angle of the plurality of pixels using the pixel information of the plurality of pixels and also determines a degree of confidence of the orientation angle if the plurality of pixels using for example, both horizontally and vertically aligned existing pixels from the ground of pixels. As such, the circuit 608 produces information 616 indicating a degree of confidence that the plurality of pixels that surround the pixel of interest includes some type of specific geometric feature therein, such as a diagonal line. The integrated circuit 600 may also include, for example, circuitry 618 that verifies that the pixel to be interpolated would be part of the geometric feature if the degree of confidence is beyond a threshold such as if the degree of confidence is high enough. In this example, if the specific geometric feature is an edge of an object for example, or a diagonal edge, the circuit 618 receives pixel correlation information 621 from circuitry 620 that is operative to correlate pixels of the plurality of pixels, to verify that the determined angle of orientation is correct. For example, the pixel correlation circuit 620 produces the pixel correlation information 621 which may be for example data representing absolute differences between pixel pairs along diagonal lines that cross the missing pixel that is to be constructed. The edge orientation qualification circuit 618 in combination with the pixel correlation circuit 620 correlate pixels of the plurality of pixels and verifies the determined angle of orientation is correct and both horizontal and vertically positioned pixels that are located about the pixel to be interpolated are used.

The output of the edge orientation qualification logic 618 includes output information 619 such as 'confidence' and 'angle information'. 'Confidence' carries information about how close pixels underneath the current filter kernel position resemble a line-like segment, while angle information carries information about line segment orientation with respect to a reference coordinate system axis. The edge interpolation logic 610 uses the confidence and angle information to generate a missing pixel 614.

Figure 7:
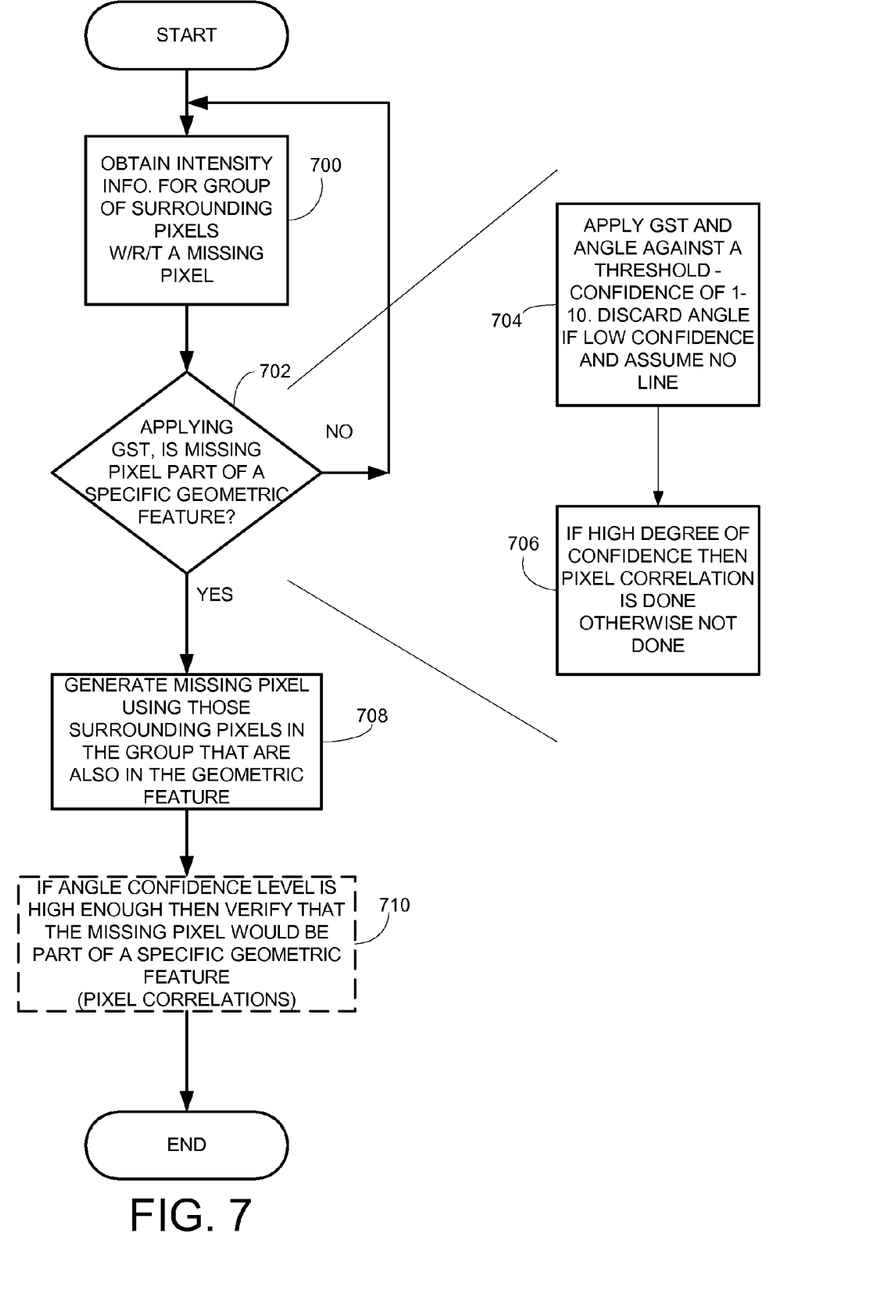
FIG. 7 is a flowchart illustrating one example of a method for interpolating image information in accordance with one embodiment of the invention.

FIG. 7 illustrates one example of a method for interpolating image information that may be carried out for example by the apparatus show in FIG. 6, or any other suitable system, device, or any other suitable structure. As shown in block 700, a method includes obtaining pixel information, such as color information, intensity information or any other suitable pixel information, for plurality of existing pixels surrounding a location of a pixel to be interpolated. This may include, for example, obtaining portions of an image of existing pixels from a frame bufferer, a stream of video information, texture map, or any other suitable source of pixel information. By way of illustration only, and not limitation, in this example, the method includes obtaining a kernel or a group of pixels that are symmetrical around a pixel to be interpolated and can be of any suitable size. The size should be selected to be large enough to extract information as to the orientation or specific geometric feature that is identifiable via the group of surrounding pixels. This may be, for example, a 4×6 group of pixels and may be selected around a missing pixel. For example, referring also to FIG. 9, the figure illustrates a group of pixels 900 in a 4×6 array or kernel with the missing pixel or pixel to be interpolated labeled "s". To determine the specific geometric feature enhance, in this example, the angle of orientation of a diagonal line, the orientation as based on the kernel. As shown in block 702, the method includes applying a gradient square tensor operation on the plurality of surround pixels to at least determine if the pixel to be interpolated is part of a specific geometric feature, such as a diagonal line, or other suitable geometric feature. This may include, for example, determining an orientation angle of the plurality of pixels using the pixel information of the plurality of pixels. This may involve, for example, utilizing the squared gradients calculations, low pass filtering and matrix construction to obtain the orientation angle. An example of this operation to determine the orientation is shown below.

Find Gradients

To find gradients Ix and Iy the following pair of filters can be used to convolve with the kernel:

$$h_y = \begin{bmatrix} +1 & -1 \\ +1 & -1 \end{bmatrix}, h_x = \begin{bmatrix} +1 & +1 \\ -1 & -1 \end{bmatrix}$$

Square (Multiply) Gradients $$Ixx=Ix*Ix, Iyy=Iy*Iy, Ixy=Ix*Iy$$

Low-Pass Filter Results of the Previous Operation

Result of the previous step is subsequently low-pass filtered using the following filter:

$$h_{lp} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

After this operation there are three values (low-pass filtered versions of Ixx, Iyy and Ixy), Gxx, Gxy and Gyy.

Angle Calculation $$P = Gxx + Gyy$$

$$Q = Gxx - Gyy$$

$$R = \sqrt{Q^2 + 4 \cdot Gxy^2}$$

$$L1 = \frac{P+R}{2}$$

$$L2 = \frac{P-R}{2}$$

-continued $$\text{Angle} = \tan^{-1}\left(\frac{L1 - Gxx}{Gxy}\right)$$

After the step the orientation angle has been found.

The low pass filter may be used, for example, to filter out noise in the estimate. Once a angle calculation has been made, the orientation might be false because the underlying structure does not exhibit suitable geometric feature, such as a line, an edge, or a slope of a uniform direction. As such, it may be desirable to qualify the angle calculation. Multiple methods may be used to qualify the confidence level. In one example, an isotropic calculation may be used that determines a degree of confidence that the angle is correct. As such, it may be desirable to store a set of thresholds so that when the angle calculation is determined, if it is over a threshold the angle may be confirmed as being the appropriate angle of orientation for the diagonal line. The anisotropic calculation can be represented as shown below:

$$aniso = P*P/(GxxGyy - GxyGxy)$$

For angles close to multiple of 90 degrees (including 0 degree), the aniso must be big to qualify the angle. Thresholds can be set so that when aniso is over the threshold, the angle is then qualified.

As such, the application of a gradient square tensor operation may include, if desired, determining a degree of confidence that the orientation angle of the plurality of pixels is suitable. This may be done, for example, by applying anisotropic calculation as noted above. Alternatively, or in addition, any correlation technique may also be employed.

It will be recognized that it may be desirable to have a type of double check of the degree of confidence that the angle of orientation that is correct by verifying that the pixel to be interpolated would be part of the geometric feature. This may include, for example, applying a pixel correlation operation by correlating pixels of the plurality of pixels to verify that the determined angle of orientation is correct. This may be done, for example, by using both horizontal and vertically positioned pixels in the group of pixels that are located about the location of the pixel to be interpolated. This, as shown for example, in block 710 where the missing pixel value may be generated but not output as the final value and the verification may be made using pixel correlation techniques. Alternatively, the verification that the confidence level is high enough, may be performed in any other suitable stage in the process. It will also be recognized that the steps herein may be performed in any suitable order, as desired.

In one example, applying a gradient square tensor operation may include, for example, applying a gradient square tensor operation and a determined angle of orientation against a threshold such as a confidence level between 1 and 10. If the confidence level is not high enough, the angle is discarded and the assumption is that there is no diagonal line. This is shown in block 704. As shown in 706, if there is a high degree of confidence that the evaluated pixels are to form an angle that includes the pixel to be interpolated, then the method includes utilizing pixel correlation techniques to determine which pixels in the kernel should be used to interpolate or generate the missing pixel.

As shown in block 708, after the gradient square tensor operation is applied to determine if a pixel is to be interpolated as part of a specific geometric feature, the method includes interpolating the pixel to be interpolated using pixel information from at least some of the surrounding pixels that are also determined to be in the geometric feature. This may include, for example, averaging two pixels that are existing that are determined to be in the diagonal line on opposite sides of a missing pixel for example, and the average of these two pixel values may then be used as the pixel value of the intermediate or missing pixel.

Figure 10:
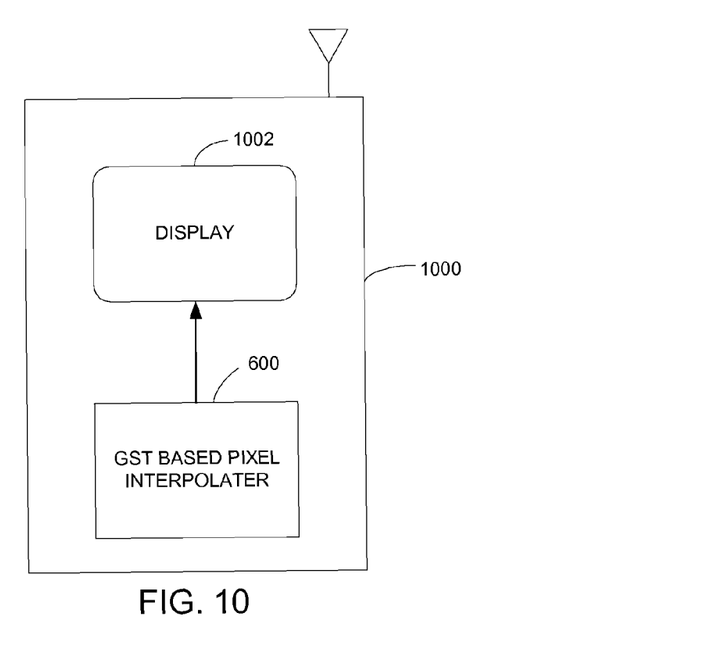
FIG. 10 is a diagram illustrating one example of an apparatus that interpolates image information in accordance with one embodiment of the invention.

The operations of obtaining the pixel information, applying a gradient square tensor operation and interpolating the pixel may be repeated on a group of pixel basis, such as on a per-block basis in a field of pixels. A field may be any set of pixels that require scaling up or down and may include, for example, texture maps, bit maps, fields of video, or any other suitable grouping of pixels. The group of pixels that are missing are generated for those pixels in the group to produce a frame of pixel information. The apparatus 1000 or any other suitable apparatus may also display the resulting frame containing the interpolated pixels on a display. The display may include a printer or a remote display device from the device that actually carries out the interpolation operation. It will be recognized that the interpolation of pixels may be interpolated in both horizontal and vertical directions.

Figure 8:
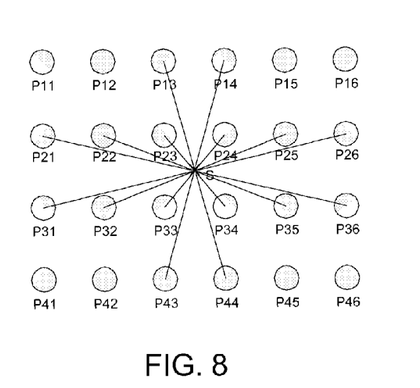
FIG. 8 is a diagram showing pixels that can be used for correlation purposes in accordance with one embodiment of the invention.

FIG. 8 diagrammatically illustrates employing a pixel correlation method in accordance with one embodiment of the invention. For example, once an angle is qualified using the anisotropy calculation, the angle can be qualified again using any suitable pixel correlation method. For example, the technique may include correlating pixels of the plurality of pixels P11-P46 but only those shown by connected lines to verify that the determined angle of orientation (the direction of the angle). Both horizontal and vertically positioned pixels about the location of the pixel to be interpolated are used. For example, the method may include calculating the absolute distances along the intersected angles that are formed by the original pixels surrounding the missing pixel. As shown in FIG. 8, eight orientations are chosen. The absolute difference between the two pixels along each line is calculated. If the absolute difference along the qualified angle is the smallest or one of the smallest, the orientation is chosen. Otherwise a closer angle with the smallest or one of the smallest differences may be chosen. If this condition cannot be satisfied, a less wider angle with suitable pixel correlation may be chosen or it may be eventually determined that no orientation is assigned to the missing pixel. Once the angle is selected along with the pixel in the angle, the missing pixel value S is calculated as the average between the correlated pixels.

Figure 9:
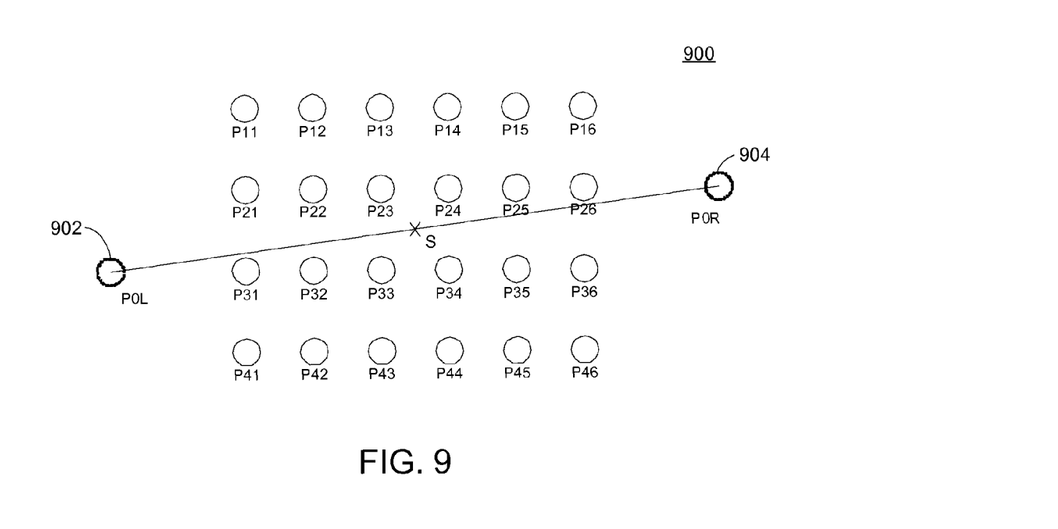
FIG. 9 diagrammatically illustrates the determination of suitable existing pixels that can be used to determine a pixel to be interpolated in accordance with one embodiment of the invention.

FIG. 9 graphically illustrates a condition where the orientation of wide angles may be used to correlate pixels outside the kernel boundary. For example, the kernel shown as 900 may be used to determine pixel values P0L 902 and P0R 904 to correlate pixels outside the kernel size. Instead of increasing the kernel size, which can involve more computation complexity, the value of pixels that are outside of the kernel may be extrapolated using pixels inside the kernel. For example, P0R=3×P26-2×P25 and P0L=3×P31-2×P32. As such, the circuitry is operative to, among other things, extrapolate pixel values for pixels outside a group of surrounding pixels to determine an orientation angle of the plurality of pixels in the geometric feature.

FIG. 10 illustrates one example of an apparatus, such as a wireless cell phone, or any other suitable device that may employ the circuitry described herein. In this example, the apparatus 1000 includes a display 102 that is operatively coupled to the integrated circuit 600 through any suitable interconnection or subsystem such as a host processor and suitable buses or any other configuration as desired. As such, the apparatus 1000 includes the integrated circuit that is operative to obtain pixel information, such as intensity information, for a plurality of pixels surrounding a location of a pixel to be interpolated and applied a gradient square tensor operation on the plurality of surrounding pixels to at least determine if the pixel to be interpolated is part of a specific geometric feature. If so, the circuit interpolates the pixel to be interpolated using pixel information from at least some of the surrounding pixels that are also in the geometric feature. The operations previously described are applicable for this apparatus as well so that the apparatus may suitably interpolate pixels on a block-by-block basis if desired using a moving window approach as described above. The apparatus produces the resulting image which may be stored in memory, such as memory 602 (not shown) wherein the image stored in the memory is made according to the method described above.

The described circuits and methods allow the reconstruction of missing lines in a video field, other suitable portion of a field or frame or block of pixels using existing lines in the field using a relatively low complex and accurate interpolation technique on various diagonal angles or other geometric features in an image. A type of spatial de-interlacing is provided using a gradient square tensor operation. Other advantages will be recognized by one of ordinary skill in the art.

The above detailed description of the invention and the examples described therein have been presented for the purposes of illustration and description only and not by limitation. For example, a recursion method can be used to employ an interpolated pixel to determine another pixel to be interpolated if desired. It is therefore contemplated that the present invention cover any and all modifications, variations or equivalents that fall within the spirit and scope of the basic underlying principles disclosed above and claimed herein.

What is claimed is:

1. A method for interpolating image information comprising:
    (a) obtaining pixel information for a plurality of pixels surrounding a location of a pixel to be interpolated;
    (b) applying a gradient square tensor operation on the plurality of surrounding pixels to determine if the pixel to be interpolated is part of a geometric feature comprising;
        determining an orientation angle of the plurality of pixels using the pixel information of the plurality of pixels; and
        determining a degree of confidence of the orientation angle of the plurality of pixels;
    (c) if the pixel is part of a geometric feature, interpolating the pixel to be interpolated using pixel information from at least some of the surrounding pixels that are also determined to be in the geometric feature;
    after interpolation of the pixel, applying a pixel correlation operation by correlating pixels of the plurality of pixels to determine again if the pixel to be interpolated is part of the geometric feature; and
    extrapolating pixel values for pixels outside a group of surrounding pixels to determine an orientation angle of a plurality of pixels in the geometric feature.

2. The method of claim 1, wherein both horizontal and vertically positioned pixels about the location of the pixel to be interpolated are used to apply the pixel correlation operation to determine again if the pixel to be interpolated is part of the geometric feature.

3. The method of claim 1 wherein operations (a)-(c) are repeated on a group of pixels basis in a field of pixels for all desired groups in the field to produce a frame of pixel information.

4. The method of claim 3 comprising displaying the frame containing the interpolated pixels on a display.

5. A method for interpolating image information comprising:
    (a) obtaining pixel information for a plurality of pixels in a field that surround a location of a pixel to be interpolated;
    (b) applying a gradient square tensor operation on the plurality of surrounding pixels to determine if the pixel to be interpolated is part of a specific geometric feature by determining an orientation angle of the plurality of pixels using the pixel information of the plurality of pixels; and determining a degree of confidence of the orientation angle of the plurality of pixels;
    (c) if so, interpolating the pixel to be interpolated using pixel information from those surrounding pixels in the field that are also in the geometric feature;
    after interpolation of the pixel, applying a pixel correlation operation by correlating pixels of the plurality of pixels to determine again if the pixel to be interpolated is part of the geometric feature;
    (d) repeating steps (a)-(b) for all pixels to be interpolated;
    (e) producing, from the field, an interlaced frame that contains at least some interpolated pixels produced by step (c); and
    extrapolating pixel values for pixels outside a group of surrounding pixels to determine an orientation angle of a plurality of pixels in the geometric feature.

6. The method of claim 5 wherein the interpolated pixels are interpolated in the horizontal and vertical directions.

7. The method of claim 5, wherein both horizontal and vertically positioned pixels about the location of the pixel to be interpolated are used to apply the pixel correlation operation to determine again if the pixel to be interpolated is part of the geometric feature.

8. An integrated circuit comprising:
    circuitry operable to obtain pixel information for a plurality of pixels surrounding a location of a pixel to be interpolated;
    circuitry operable to apply a gradient square tensor operation on the plurality of surrounding pixels to at least determine if the pixel to be interpolated is part of a geometric feature, wherein the circuitry operable to apply the gradient square tensor comprises circuitry operative to determine an orientation angle of the plurality of pixels using the pixel information of the plurality of pixels; and determine a degree of confidence of the orientation angle of the plurality of pixels;
    circuitry operable to interpolate the pixel to be interpolated using pixel information from at least some of the surrounding pixels that are also in the geometric feature;
    circuitry operable to, after interpolation of the pixel, apply a pixel correlation operation by correlating pixels of the plurality of pixels to determine again if the pixel to be interpolated is part of the geometric feature; and
    circuitry operative to extrapolate pixel values for pixels outside a group of surrounding pixels to determine an orientation angle of a plurality of pixels in the geometric feature.

9. The integrated circuit of claim 8, wherein both horizontal and vertically positioned pixels about the location of the pixel to be interpolated are used by the circuitry operable to apply the pixel correlation operation to determine again if the pixel to be interpolated is part of the geometric feature.

10. An apparatus comprising:
    a display;
    circuitry operatively coupled to the display and operative to obtain pixel information for a plurality of pixels surrounding a location of a pixel to be interpolated; to apply a gradient square tensor operation on the plurality of surrounding pixels to determine if the pixel to be interpolated is part of a geometric feature; and to interpolate the pixel to be interpolated using pixel information from at least some of the surrounding pixels that are also in the geometric feature;

wherein the circuitry is operative to extrapolate pixel values for pixels outside a group of surrounding pixels to determine an orientation angle of a plurality of pixels in the geometric feature;

wherein the circuitry is operative to determine an orientation angle of the plurality of pixels using the pixel information of the plurality of pixels; and determine a degree of confidence of the orientation angle of the plurality of pixels; and wherein the circuitry is operative to, after interpolation of the pixel, apply a pixel correlation operation by correlating pixels of the plurality of pixels to determine again if the pixel to be interpolated is part of the geometric feature.

11. The apparatus of claim 10, wherein both horizontal and vertically positioned pixels about the location of the pixel to be interpolated are used by the circuitry to apply the pixel correlation operation to determine again if the pixel to be interpolated is part of the geometric feature.

12. A method for interpolating image information comprising:
   (a) obtaining pixel information for a plurality of pixels surrounding a location of a pixel to be interpolated;
   (b) applying an edge detection operation on the plurality of surrounding pixels to determine if the pixel to be interpolated is part of a geometric feature comprising;
      determining an orientation angle of the plurality of pixels using the pixel information of the plurality of pixels; and
      determining a degree of confidence of the orientation angle of the plurality of pixels;
   (c) if the pixel is part of a geometric feature, interpolating the pixel to be interpolated using pixel information from at least some of the surrounding pixels that are also determined to be in the geometric feature;
   after interpolation of the pixel, applying a pixel correlation operation by correlating pixels of the plurality of pixels to determine again if the pixel to be interpolated is part of the geometric feature; and
   extrapolating pixel values for pixels outside a group of surrounding pixels to determine an orientation angle of a plurality of pixels in the geometric feature.

* * * * *